US006766639B2

(12) United States Patent  
Malmborg

(10) Patent No.: US 6,766,639 B2
(45) Date of Patent: Jul. 27, 2004

(54) ACOUSTIC-STRUCTURAL LPC SPLITTER

(75) Inventor: Eric William Malmborg, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 17 days.

(21) Appl. No.: 10/261,561

(22) Filed: Sep. 30, 2002

(65) Prior Publication Data

US 2004/0060280 A1 Apr. 1, 2004

(51) Int. Cl.[7] ............................ F02C 6/00; F02K 11/00; B64D 33/02
(52) U.S. Cl. ..................... 60/226.1; 60/262; 60/799; 60/801; 415/119; 181/214; 181/222
(58) Field of Search ................. 60/226.1, 262, 60/799, 801; 181/213, 214, 222; 415/119

(56) References Cited

U.S. PATENT DOCUMENTS

| | | | | |
|---|---|---|---|---|
| 3,477,231 A | * | 11/1969 | Paulson | 60/269 |
| 3,542,152 A | * | 11/1970 | Adamson et al. | 181/214 |
| 5,222,360 A | * | 6/1993 | Antuna et al. | 60/226.1 |
| 5,307,623 A | * | 5/1994 | Antuna et al. | 60/226.1 |

* cited by examiner

Primary Examiner—Charles G. Freay
(74) Attorney, Agent, or Firm—Bachman & LaPointe, P.C.

(57) ABSTRACT

An acoustic-structural LPC splitter assembly which comprises a structural acoustic splitter through which are arranged a plurality of bleed exhaust ports, the acoustic splitter having a first and second end, an inner and outer surface, a front joint for securing the first end, and a slip joint formed at an FEGV interface for securing the second end, wherein the structural acoustic splitter provides support sufficient to maintain concentricity of an LPC inner case.

10 Claims, 4 Drawing Sheets

ACOUSTIC-STRUCTURAL LPC SPLITTER

BACKGROUND OF THE INVENTION

(1) Field of the Invention

The present invention relates to an acoustic-structural low-pressure compressor (LPC) splitter assembly constructed so as to reduce weight and increase structural support. More specifically, this invention relates to an acoustic-structural LPC splitter assembly providing integral support for a plurality of low-compressor bleed exhaust ports.

(2) Description of the Prior Art

A gas turbine splitter is located axially downstream of the engine's fan stage. The fan exit stream air is "split" by the splitter assembly into two flow streams: core flow and bypass flow.

A standard gas turbine splitter assembly consists of: the splitter nose, acoustic panel cowling, low-compressor bleed exit duct, and low-pressure compressor (LPC) stator case support structure. This configuration consists of a large quantity of parts and is heavy, especially on large thrust engines. The low-compressor bleed is used during engine starting and surge conditions.

What is needed is a gas turbine splitter assembly that is strong enough to withstand the gas loading of fan exit streams and maneuver loading, covered with acoustic material to attenuate fan noise, and is lightweight.

SUMMARY OF THE INVENTION

Accordingly, it is an object of the present invention to provide an acoustic-structural LPC splitter assembly providing integral support for a plurality of low-compressor bleed exhaust ports.

In accordance with the present invention, an acoustic-structural splitter assembly for use in an engine which comprises a structural acoustic splitter through which are arranged a plurality of bleed exhaust ports, the acoustic splitter having a first and second end, an inner and outer surface, a front joint for securing the first end, and a slip joint formed at an FEGV interface for securing the second end, wherein the structural acoustic splitter provides support sufficient to maintain concentricity of an LPC inner case.

DETAILED DESCRIPTION

The present invention integrates several low-pressure compressor (LPC) static structure part functions into a single part while simultaneously reducing weight and cost and increasing acoustic treatment. The present invention combines the load bearing and hoop stiffness of the LPC bleed cavity structure with the acoustic treatment of the flowpath fairing. The resulting design is a sandwich construction of structural and acoustic materials providing the hoop and flexural stiffness and acoustic treatment needed in LPC fairings.

Figure 1:
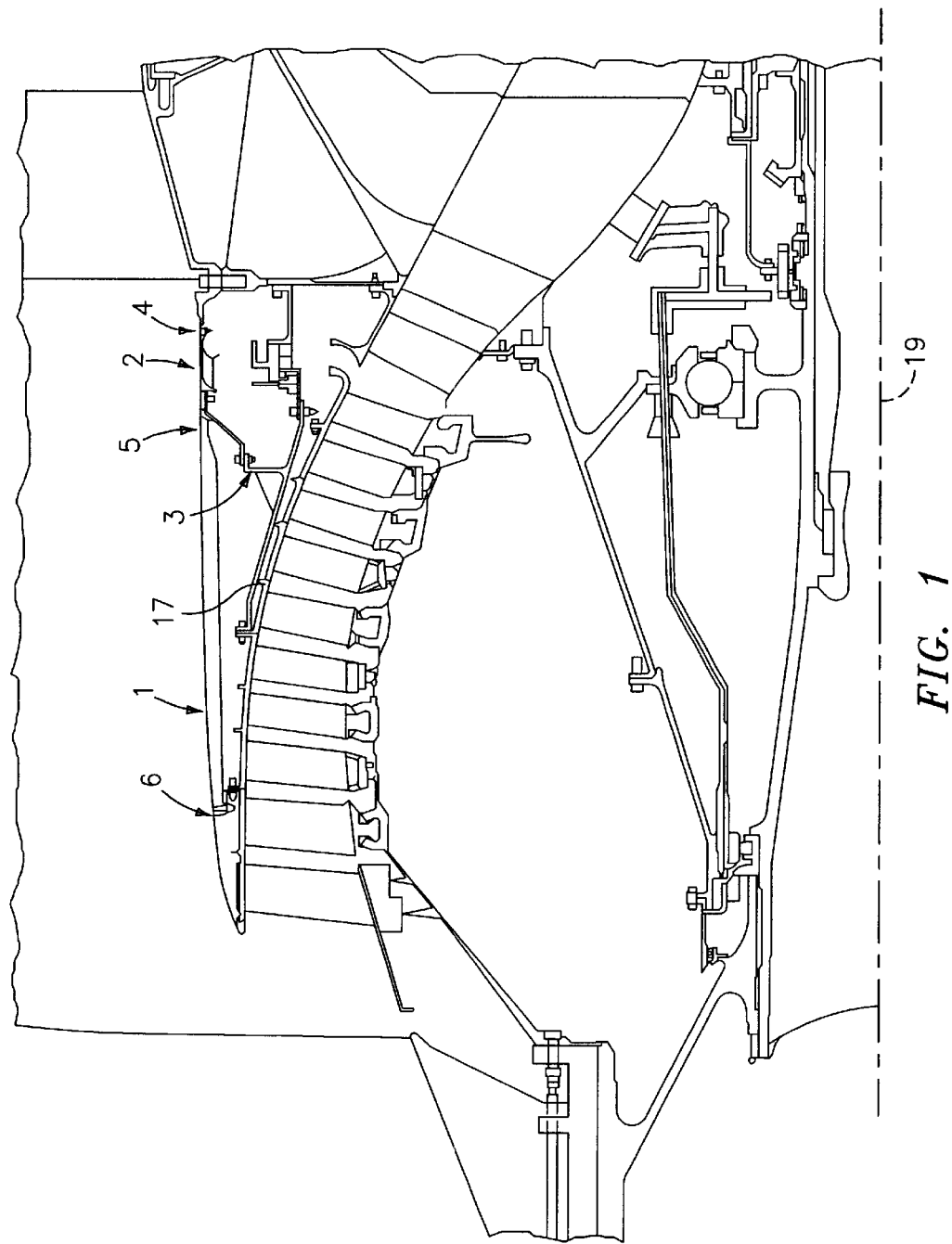
FIG. 1 A cross-section illustration of an LPC splitter known in the art.

With reference to FIG. 1, there is illustrated in cross section a conventional commercial LPC known to the art. The following described elements comprising the LPC are formed from rotating the cross section about a center axis 19 through 360 degrees. The flowpath fairing 1 with attached acoustic treatment bridges the expanse formed between the fairing front bolted joint 6 oriented towards the front of the engine and the fairing slip joint 5 located further aft of the fairing front bolted joint 6. Fairing slip joint 5 is supported in part by flowpath fairing support and stator case stiffener 3 which extends from the LPC inner case 17 to the fairing slip joint 5. Between the fairing bolted joint 4 and the fairing slip joint 5, there may be inserted one or more low compressor bleed exhaust ports 2.

Figure 2:
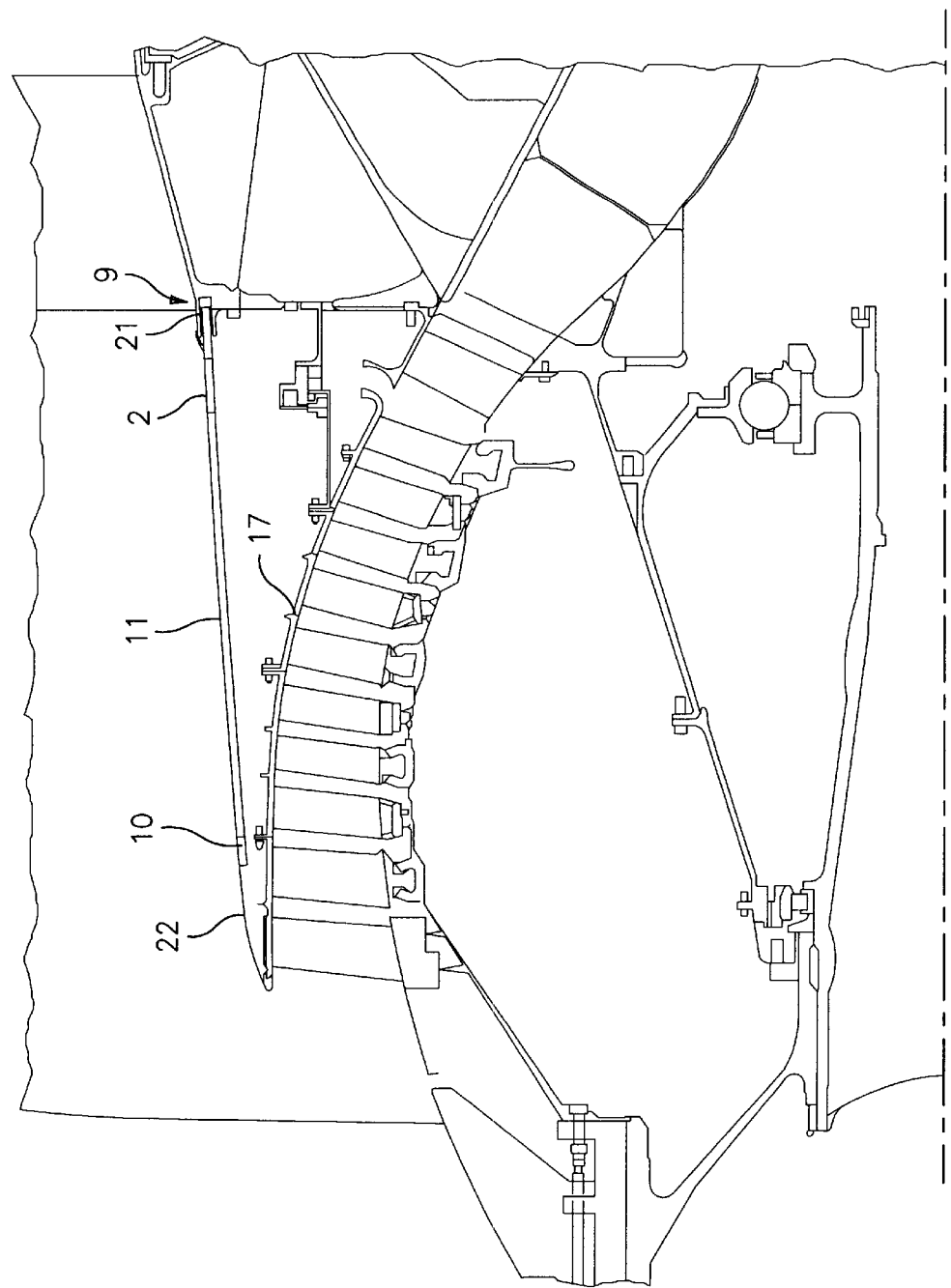
FIG. 2 A cross-section illustration of the acoustic-structural LPC splitter of the present invention.

With reference to FIG. 2, there is illustrated the acoustic-structural LPC splitter of the present invention. The flowpath fairing, is extended from splitter 22 to the fan exit guide vane (FEGV) interface 9, whereby there is formed fairing slip joint 21. By extending the flowpath fairing 1 to the FEGV interface 9 and using structural materials, flowpath fairing 1 becomes structural acoustic splitter 11. Structural acoustic splitter 11 is a load carrying member of full hoop construction. Structural acoustic splitter 11 is self supporting with regards to any attached acoustic treatment and provides support to the LPC inner case 17.

Figure 5:
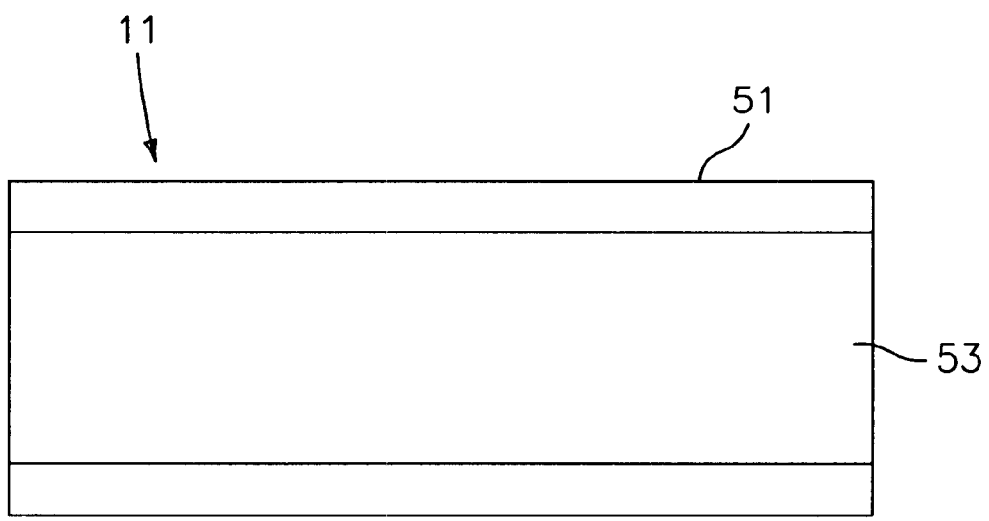
FIG. 5 A cross-section illustration of the acoustic structural splitter of the present invention.

In a preferred embodiment, the acoustic treatment is integral to structural acoustic splitter 11. As illustrated in FIG. 5, structural acoustic splitter 11 may be formed of an acoustic material 53 with composite backing skin 51 bonded to one or both sides. The acoustic material 53 may be comprised of metallic or composite material. In an alternative embodiment, the acoustic material 53 may be omitted entirely or sprayed or otherwise attached to an existing structural acoustic splitter 11.

As a result of these structural alterations, there is eliminated the need for the flowpath fairing support and stator case stiffener 3. Being of full hoop construction, the structural acoustic splitter 11 improves LPC case concentricity, resulting in longer performance retention. Extending the flowpath fairing 1 to form structural acoustic splitter 11 also improves noise attenuation via an increase in acoustically treated surface area. In a preferred embodiment, low-compressor bleed exhaust ports 2 are periodically cut through the structural acoustic splitter 11. By doing so, the metallic structure and bolts supporting these ports are eliminated. Low compressor bleed exhaust ports 2 may be glued in from the inner or outer diameter, bolted in, or otherwise fastened to structural acoustic splitter 11.

The structural acoustic splitter 11 can still accommodate thermal growth along the engine axis by including an aft slip joint 21 at the FEGV interface 9. Positive circumferential, radial and axial restraint is still maintained by the conventional bolted joint 10.

Figure 3:
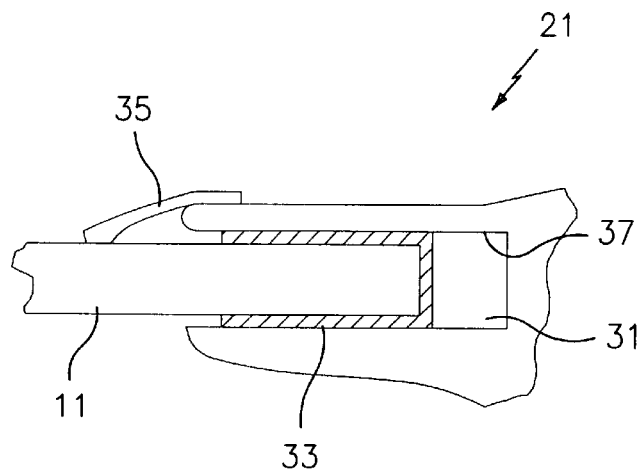
FIG. 3 A diagram of the aft slip joint of the present invention.

With reference to FIG. 3, there is illustrated in detail an aft slip joint 21 in accordance with the present invention. Aft slip joint 21 is formed from full hoop slot 31 into which is inserted an end of structural acoustic splitter 11. Surrounding the end of structural acoustic splitter 11 and in contact with an inner surface 37 of full hoop slot 31 there is dispersed a sacrificial wear material 33. As structural acoustic splitter 11 undergoes thermal expansion and contraction, it slides forwards and backwards inside of full hoop slot 31.

Sacrificial wear material 33 serves to prevent wear on structural acoustic splitter 11 and can be replaced when a quantity has been compromised sufficient to impede the performance of structural acoustic splitter 11. In addition, a lap seal 35 may be attached to structural acoustic splitter 11 and extend rearward to cover the interface between structural acoustic splitter 11 and full hoop slot 31.

Figure 4:
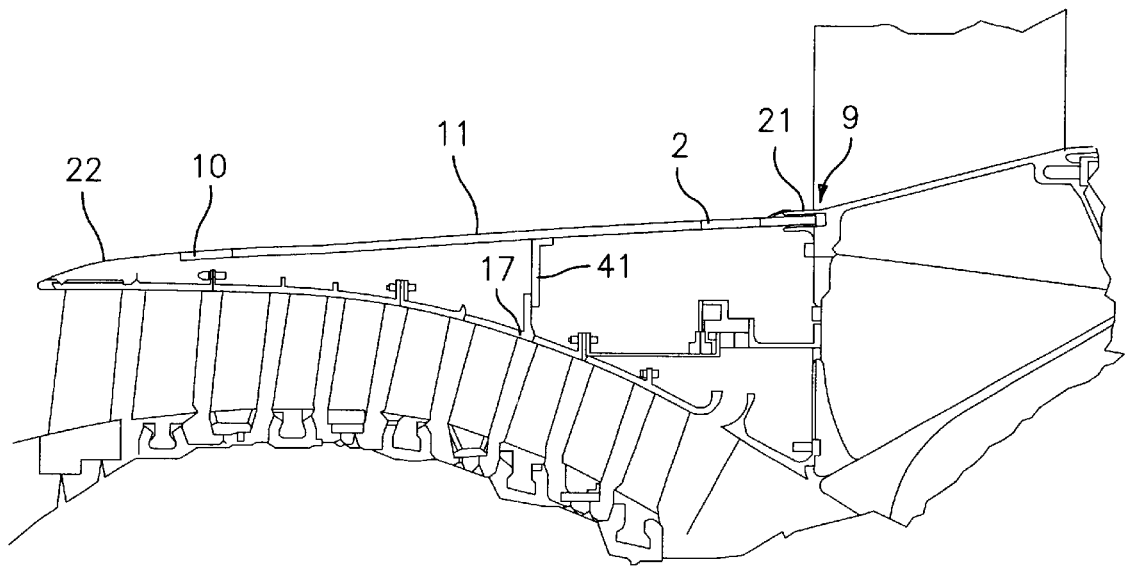
FIG. 4 A diagram of an alternative embodiment of the acoustic-structural LPC splitter of the present invention.

With reference to FIG. 4 there is illustrated an alternative embodiment of the present invention. A radial stiffener 41 is attached between the LPC inner case 17 and structural acoustic splitter 11. Radial stiffener 41 attaches to an underside of structural acoustic splitter 11 between aft slip joint 21 and bolted joint 10.

The structural acoustic splitter 11 of the present invention weighs less than a standard splitter assembly due to reduced part count and a reduction in size of the LPC stator case support structure. The structural acoustic splitter 11 of the present invention is axially longer than a typical flowpath fairing 1 and provides a greater surface area for application of acoustic material, which will result in less fan noise. In addition, low-compressor stage bleed exit ports radially flow core air into the bypass air stream and are positioned at discrete locations circumferentially around the cowl.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An acoustic-structural LPC splitter assembly for use in an engine, comprising:

an acoustic-structural splitter, said acoustic-structural splitter having a first and second end, and an inner and outer surface;

a front joint for securing said first end of said acoustic-splitter to a splitter; and a slip joint for securing said second end of said acoustic-structural splitter to an FEGV interface, wherein said acoustic-structural splitter provides support sufficient to maintain concentricity of an LPC inner case.

2. The acoustic-structural LPC splitter assembly of claim 1, further comprising a plurality of bleed exhaust ports extending through said acoustic-structural splitter.

3. The acoustic-structural LPC splitter assembly of claim 1, wherein said slip joint further comprises:

a slot having a first and second leading edge for receiving said second end of said structural-acoustic splitter; and a sacrificial material disposed about a portion of said slot in contact with said second end of said structural acoustic splitter.

4. The acoustic-structural LPC splitter assembly of claim 3, wherein said slot is of full hoop construction.

5. The acoustic-structural LPC splitter assembly of claim 2, wherein a lap seal is attached to said second end of said structural-acoustic splitter and extends to cover a first leading edge of said slip joint.

6. The acoustic-structural LPC splitter assembly of claim 1, wherein said structural-acoustic splitter comprises:

an acoustic material having a first and second surface; and at least one structural backing skin bonded to said first or second surface.

7. The acoustic-structural LPC splitter assembly of claim 6, wherein said acoustic material is a metallic or composite material.

8. The acoustic-structural LPC splitter assembly of claim 6, wherein said structural backing skin is comprised of a material selected from the group consisting of metallic and composite materials.

9. The acoustic-structural LPC splitter assembly of claim 1 further comprising a radial stiffener extending radially between said acoustic-structural splitter and a LPC inner case.

10. An acoustic-structural LPC splitter assembly for use in an engine, comprising an acoustic-structural splitter through which are arranged a plurality of bleed exhaust ports.

* * * * *